United States Patent
Karikallio (10) Patent No.: US 12,034,606 B2
(45) Date of Patent: Jul. 9, 2024

(54) MAINTENANCE PRIORITY IN COMMUNICATION NETWORK

(71) Applicant: Elisa Oyj, Helsinki (FI)

(72) Inventor: Henri Karikallio, Helsinki (FI)

(73) Assignee: Elisa Oyj, Helsinki (FI)

( * ) Notice: Subject to any disclaimer, the term of this patent is extended or adjusted under 35 U.S.C. 154(b) by 104 days.

(21) Appl. No.: 17/619,093

(22) PCT Filed: Jun. 9, 2020

(86) PCT No.: PCT/FI2020/050400
§ 371 (c)(1),
(2) Date: Dec. 14, 2021

(87) PCT Pub. No.: WO2020/254721
PCT Pub. Date: Dec. 24, 2020

(65) Prior Publication Data
US 2022/0255809 A1 Aug. 11, 2022

(30) Foreign Application Priority Data

Jun. 19, 2019 (FI) .................................... 20195536

(51) Int. Cl.
*H04L 41/149* (2022.01)
(52) U.S. Cl.
CPC .................. *H04L 41/149* (2022.05)
(58) Field of Classification Search
CPC .................................................. H04L 41/149
USPC ........................................................ 709/223
See application file for complete search history.

(56) References Cited

U.S. PATENT DOCUMENTS

| | | | |
|---|---|---|---|
| 2003/0101257 A1 | 5/2003 | Godwin | |
| 2009/0217101 A1* | 8/2009 | Becker | G05B 23/0283 714/39 |
| 2009/0259507 A1* | 10/2009 | Miwa | G06Q 10/06314 705/305 |
| 2012/0155256 A1* | 6/2012 | Pope | H04L 47/6275 370/412 |
| 2013/0051239 A1 | 2/2013 | Meredith et al. | |
| 2017/0249203 A1 | 8/2017 | Motwani et al. | |
| 2018/0197140 A1* | 7/2018 | Goja | G06Q 50/28 |

FOREIGN PATENT DOCUMENTS

| | | |
|---|---|---|
| CN | 109905885 B | 2/2021 |
| EP | 2854334 A1 | 4/2015 |

OTHER PUBLICATIONS

Finnish Patent and Registration Office, Search Report, Application No. 20195536, Mailed Jan. 7, 2020, 2 pages.

(Continued)

*Primary Examiner* — Suraj M Joshi
(74) *Attorney, Agent, or Firm* — Ziegler IP Law Group LLC.

(57) ABSTRACT

A computer implemented method of setting maintenance priority for a set of network devices of communication network. The set of network devices are arranged in an ordered list based on at least one of: customer information and usage information; and maintenance priority classes are dynamically set for the network devices based on the ordered list, wherein there are at least two different maintenance priority classes.

20 Claims, 4 Drawing Sheets

(56) References Cited

OTHER PUBLICATIONS

Notification of Transmittal of the International Search Report and the Written Opinion of the International Searching Authority, or the Declaration, Application No. PCT/FI2020/050400, Mailed Aug. 14, 2020, 17 pages.
Petrakis et al, "On the impact of real-time information on field service scheduling", Decision Support Systems, pp. 282-293, DOI: 10.1016/j.dss.2012.01.013, vol. 53, No. 2, Jan. 25, 2012.

* cited by examiner

MAINTENANCE PRIORITY IN COMMUNICATION NETWORK

TECHNICAL FIELD

The present application generally relates to maintenance priority in communication networks.

BACKGROUND

This section illustrates useful background information without admission of any technique described herein representative of the state of the art.

Base stations and other network devices of a communication network may be set to have different maintenance priorities. The maintenance priority sets a time limit for fixing faults in the network device. In this way one achieves that maintenance resources are assigned so that communication problems may be quickly solved in places where it is important to have communication ability at all times and in other places there is more time to solve the problems.

The maintenance priorities may be set by radio network designer, when the respective network device is set up. The radio network designer may make an educated guess of the appropriate maintenance priority class e.g. based on geographical location of the network device. The maintenance priority is set individually for each base station.

Now a new solution is provided.

SUMMARY

Various aspects of examples of the disclosed embodiments are set out in the claims. Any devices and/or methods in the description and/or drawings which are not covered by the claims are examples useful for understanding the disclosed embodiments.

According to a first example aspect of the disclosed embodiments, there is provided a computer implemented method of setting maintenance priority for a set of network devices of a communication network. The method comprises arranging the set of network devices in an ordered list based on customer information and usage information; and dynamically setting maintenance priority classes for the network devices based on the ordered list, wherein there are at least two different maintenance priority classes; and outputting the set maintenance priority classes for scheduling maintenance operations for fixing forthcoming communication failures.

The customer information comprises information about requirements of different customers.

In an embodiment, the method further comprises obtaining the usage information from network operation systems.

In an embodiment, the method further comprises obtaining the customer information from a customer database.

In an embodiment, the method further comprises obtaining numbers of network devices that may be dynamically assigned to different maintenance priority classes, and using these numbers in the dynamic setting of maintenance priority classes.

In an embodiment, a highest maintenance priority class corresponds to a shortest delay in maintenance actions and lower ranking maintenance priority classes correspond to longer delays in maintenance actions, and the dynamic setting of maintenance priority classes comprises setting the highest maintenance priority class for the first network devices in the ordered list and setting the lower ranking maintenance priority classes for the following network devices in the ordered list.

In an embodiment, the method further comprises overriding any previous maintenance priority classes of the network devices while setting the maintenance priority classes.

In an embodiment, the method further comprises taking any previous maintenance priority classes of the network devices into account while setting the maintenance priority classes so that new maintenance priority class of a certain network device is one step higher, one step lower or the same as the previous maintenance priority class of said certain network device.

In an embodiment, the method further comprises, when setting up a new network device, setting for the new network device a default maintenance priority class.

In an embodiment, the default maintenance priority class is a second lowest maintenance priority class.

In an embodiment, the method further comprises consecutively repeating said arranging and dynamic setting after a predefined period of time.

In an embodiment, the predefined period of time is one of the following: 1 day, 3 days, 1 week, 2 weeks, 1 month, 2 months, and 3 months.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect of the present disclosure, there is provided a computer program comprising computer executable program code which when executed by a processor causes an apparatus to perform the method of the first aspect or any related embodiment.

The computer program of the third aspect may be a computer program product stored on a non-transitory memory medium.

According to a fourth example aspect there is provided an apparatus comprising means for performing the method of the first aspect or any related embodiment.

Different non-binding example aspects and embodiments of the present disclosure have been illustrated in the foregoing. The embodiments in the foregoing are used merely to explain selected aspects or steps that may be utilized in implementations of the present disclosure. Some embodiments may be presented only with reference to certain example aspects of the disclosed embodiments. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

Example embodiments of the present disclosure and its potential advantages are understood by referring to FIGS. 1 through 5 of the drawings. In this document, like reference signs denote like parts or steps.

In an embodiment of the present disclosure maintenance priorities of network devices are dynamically changed based on network traffic. In an embodiment, changes in network traffic are taken into account in automatic adjustment of maintenance priorities in real time or nearly real time. In addition, identity of the users of the network traffic may be taken into account to take into account requirements of different customers. The maintenance priorities are dynamically set for a whole communication network or a subsection of the communication network instead of individually considering different network devices.

Network devices of a communication network may be divided into network devices that have static maintenance priority and network devices whose maintenance priority may be dynamically changed. For example, base stations serving hospitals, police stations and fire stations may be permanently set to have the highest maintenance priority in order to minimize downtime of communication services in those places. The embodiments of the present disclosure provide continuous automatic adjustment of maintenance priorities of the network devices whose maintenance priority may be dynamically changed.

There may be for example four different maintenance priority classes, but also other number of classes is possible. In any case there are at least two different maintenance priority classes in various embodiments of the present disclosure. A highest maintenance priority class corresponds to a shortest delay in maintenance actions and lower ranking maintenance priority classes correspond to longer delays in maintenance actions. In an example scenario, there are the following maintenance priority classes:
Prio1, wherein faults are fixed in 1-2 hours,
Prio2, wherein faults are fixed in 2-5 hours,
Prio3, wherein faults are fixed in 24 hours, and
Prio4, wherein faults are fixed in one week.

Figure 1:
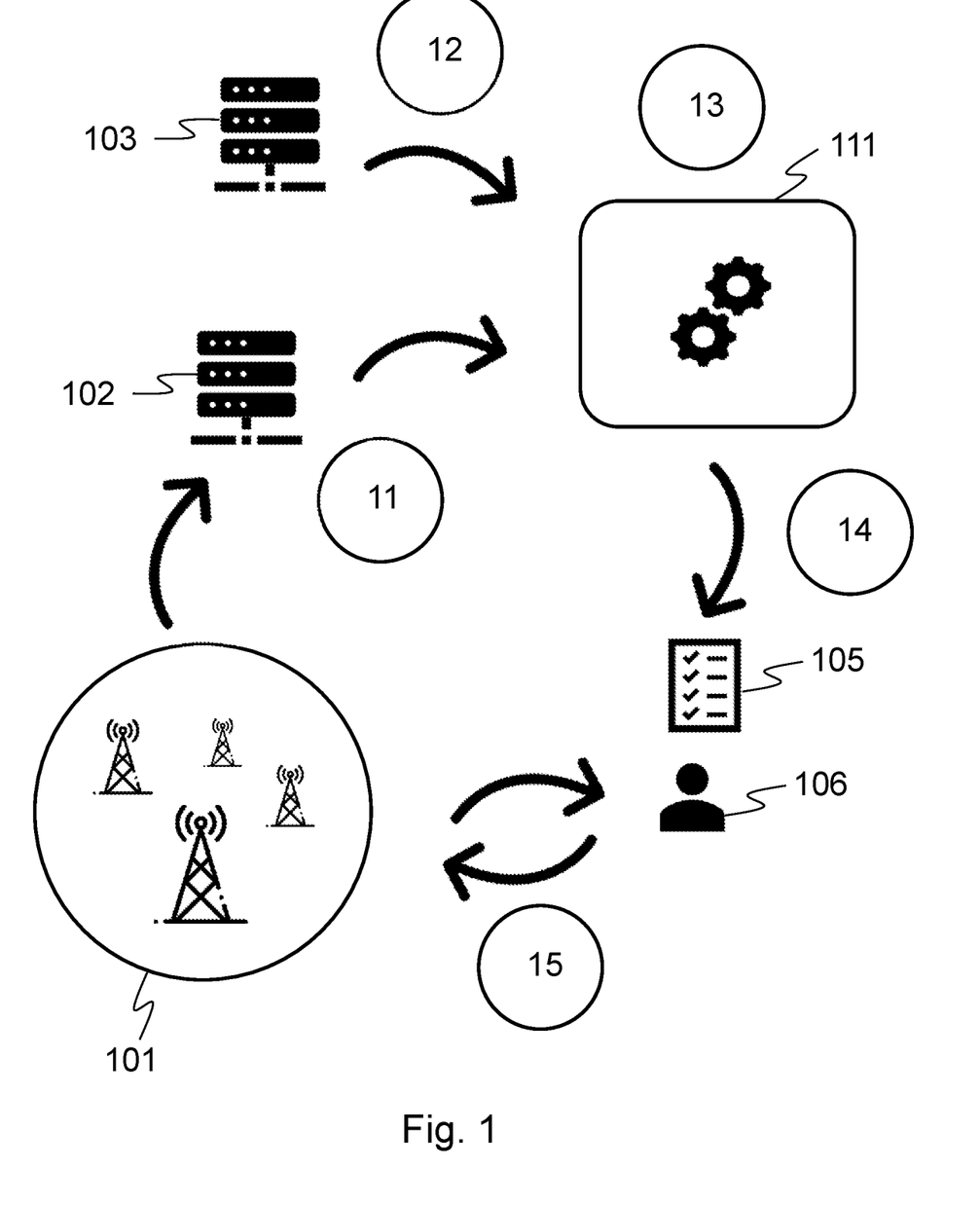
FIG. 1 shows an example scenario according to an embodiment.

FIG. 1 shows an example scenario according to an embodiment. The scenario shows a communication network 101 comprising a plurality of base stations and other network devices, and an automation system 111 configured to dynamically change maintenance priorities of network device of the communication network 101. Further, the scenario shows a network operations system 102 and a customer relationship database 103, a list 105 of maintenance priority classes provided by the automation system 111 and maintenance personnel 106.

In an embodiment of the present disclosure the scenario of FIG. 1 operates as follows: In phase 11, the automation system 111 collects usage information associated with network devices of the communication network 101. The usage information is obtained from the network operation system 102 and the usage information may comprise for example KPI, key performance indicator, values for different network devices or other usage information. Such usage information is in general readily available in the network operation system 102 for other purposes. In phase 12, the automation system 111 collects customer information from the customer relationship database 103. The customer information may comprise for example information about requirements of different customers. The customer information may comprise for example information about service level or special arrangements assigned for the customer. The phases 11 and 12 may be performed concurrently and continuously repeated.

In phase 13, the automation system 111 dynamically sets maintenance priority classes for the network devices of the communication network 101 based on the collected usage information and/or customer information. For example, usage rates of different customers and customer specific requirements may be taken into account. In phase 14, the automation system 111 outputs the list 105 of maintenance priority classes of different network devices for use by the maintenance personnel 106.

In phase 15, a communication failure occurs in one or more of the network devices of the communication network 101 and the maintenance personnel 106 use the list 105 to appropriately schedule the required maintenance operations to fix the communication failure.

The shown phases 11-14 may be continuously repeated after a predefined period of time. The predefined period of time may be one of the following: 1 day, 3 days, 1 week, 2 weeks, 1 month, 2 months, and 3 months. If the period is for example 1-2 days, the maintenance priorities may be quickly adapted to changes in network traffic. In this way for example increased network traffic during mass events may be taken into account and maintenance priority classes in the area of the mass events may be set to correspond to short maintenance delays. In this way it may be possible to minimize service disruptions experienced by large amount of people as any occurring problems are set to be fixed quickly. The maintenance priorities may then be reverted to normal situation after the network traffic in the area returns to normal. It is to be noted that adaptation of maintenance priority classes for the whole network for example every 1-2 days or even 1-2 weeks cannot be reasonably implemented by human resources. Instead, an automated system is needed.

Figure 2:
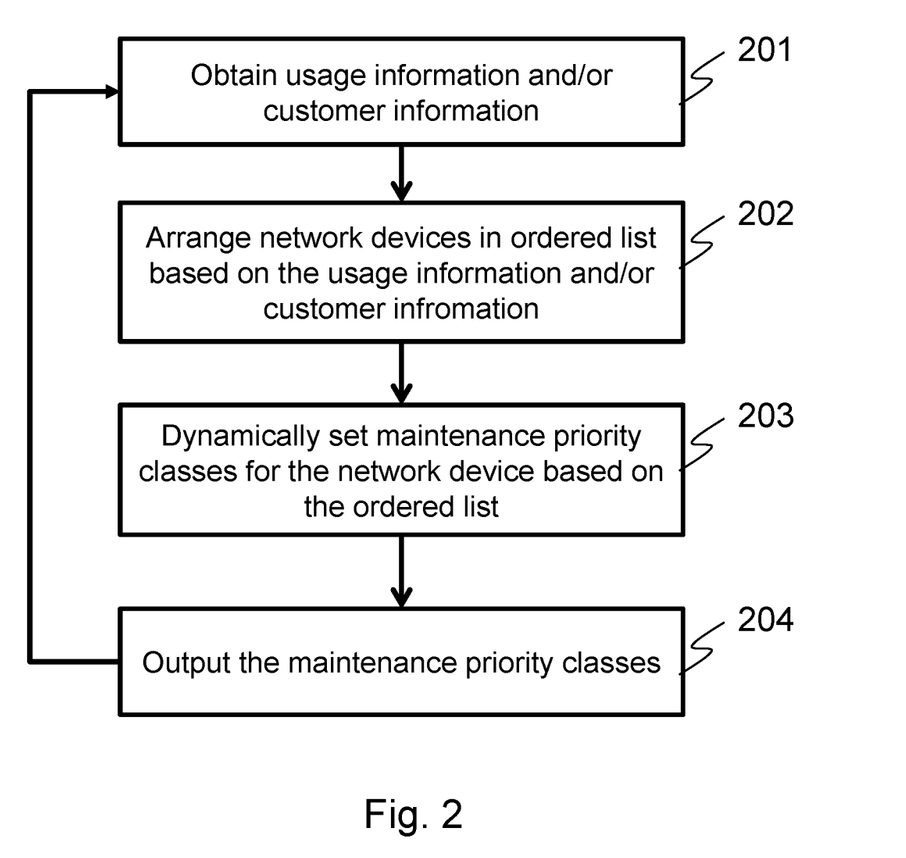
FIGS. 2-4 show flow diagrams illustrating example methods according to certain embodiments.
Figure 3:
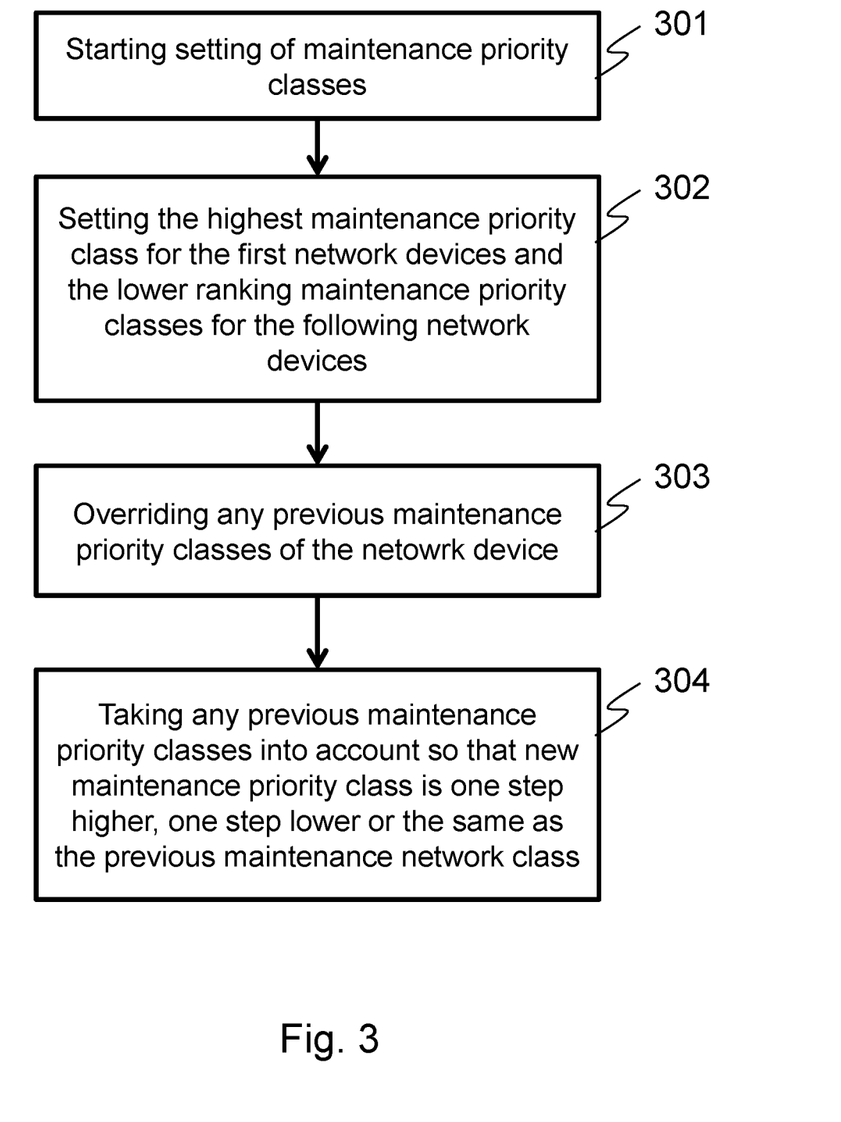
Figure 4:
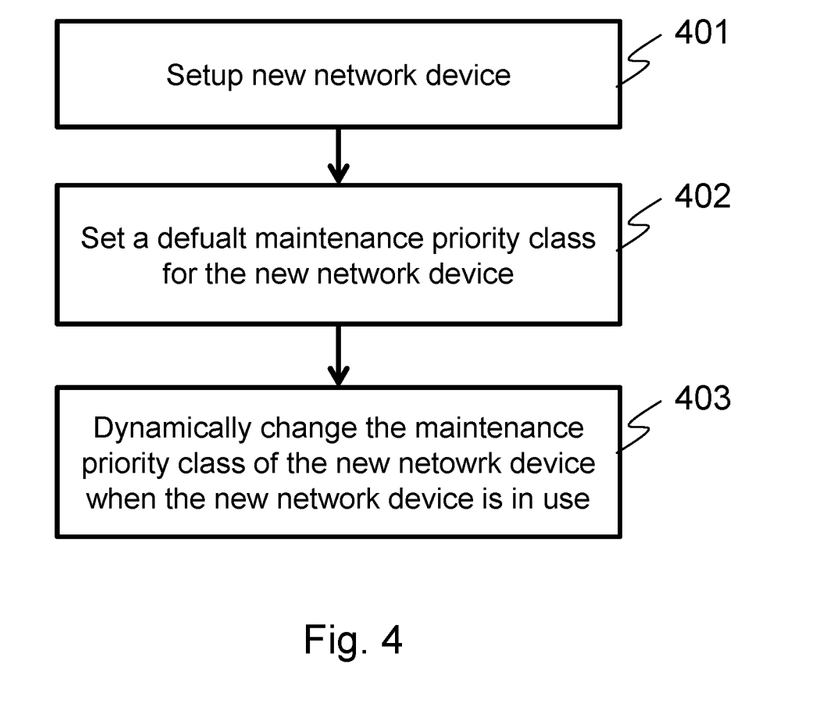

FIGS. 2-4 show flow diagrams illustrating example methods according to certain embodiments. The methods may be implemented in the automation system 111 of FIG. 1. The methods are implemented in a computer and do not require human interaction unless otherwise expressly stated. It is to be noted that the methods may however provide output that may be further processed by humans. The methods of FIGS. 2-4 may be combined with each other and the order of phases conducted in each method may be changed expect where otherwise explicitly defined. Furthermore, it is to be noted that performing all phases of the flow charts is not mandatory.

FIG. 2 shows a flow diagram illustrating a method according to an embodiment of the present disclosure. The method concerns the process of setting the maintenance priority classes. The method comprises following phases:

Phase 201: Usage information and/or customer information are obtained. The customer information may be obtained from a customer relationship database and may indicate requirements, such as service level, of the customers. The usage information may be obtained from network operation systems and the usage information may comprise for example KPI, key performance indicator, values for different network devices. The usage information may comprise also identities of the users of the network traffic in the network devices.

Phase 202: Network devices are arranged in an ordered list based on at least one of: customer information and usage information. For example, network devices serving customers with specific requirements or with high usage rates and network devices serving large amount of different users may be ranked high in the ordered list.

Phase 203: Maintenance priority classes are dynamically set for the network devices based on the ordered list of the network devices. This phase may involve obtaining numbers of network devices that may be dynamically assigned to different maintenance priority classes (i.e. sizes of the maintenance priority classes). These numbers may then be used in the dynamic setting of maintenance priority classes. The first network devices in the ordered list may be set to have the highest maintenance priority class until the highest maintenance priority class is full or nearly full. Subsequent network devices in the ordered list may then be set to have the second highest maintenance priority class until the second highest maintenance priority class is full or nearly full. In this way the network devices receive highest available maintenance priority class. It is to be noted that in alternative implementation the last network devices in the ordered list may be set to have the highest maintenance priority class, while the first network device in the list receive the lowest maintenance priority class.

Phase 204: The maintenance priority classes are output for use by maintenance personnel. They may be for example listed on a display, saved in a storage medium, or printed on a paper. The maintenance personnel can then use the maintenance priority classes for scheduling maintenance operations for fixing forthcoming communication failures FIG. 3 shows a flow diagram illustrating a method according to an embodiment of the present disclosure. The method concerns some example details of the process of setting the maintenance priority classes. The method comprises following phases:

Phase 301: Setting of the maintenance priority classes is started. The maintenance priority classes are being set for plurality of network devices arranged in an ordered list.

Phase 302: The highest maintenance priority class is set for the first (or the last) network devices in the ordered list and the lower ranking maintenance priority classes are set for the following network devices in the ordered list. Herein, the highest maintenance priority class corresponds to a shortest delay in maintenance actions and the lower ranking maintenance priority classes correspond to longer delays in maintenance actions.

Phase 303: The method overrides any previous maintenance priority classes of the network devices.

Phase 304: The method takes previous maintenance priority classes of the network devices into account so that new maintenance priority class of a network device is one step higher, one step lower or the same as the previous maintenance priority class of the network device. In this way, changes in maintenance priority classes of network devices are controlled and sudden large changes are avoided.

Herein it is noted that phases 402 and 403 concern network devices whose maintenance priority may be dynamically changed. Network devices that are set to have static maintenance priority class are set separately.

FIG. 4 shows a flow diagram illustrating a method according to an embodiment of the present disclosure. The method concerns setting up new network devices. The method comprises following phases:

Phase 401: A new network device is set up. For example, a radio network designer defines network parameters for a new base station.

Phase 402: A default maintenance priority class is set for the new network device. The default maintenance priority class may be for example the second lowest maintenance priority class of the available maintenance priority classes. In another alternative the default maintenance priority class is at least one step lower than the highest possible maintenance priority class available for the network device. The default maintenance priority class may be for example 3, if there are four maintenance priority classes 1-4, class 1 being the highest maintenance priority class corresponding to the shortest delay in maintenance actions. In this way all network devices are initially set to a relatively low maintenance priority and thereby maintenance of network devices that really require higher maintenance priority are not disturbed by new network devices.

Phase 403: The maintenance priority class of the new network device is dynamically changed when the network device is in use. This is done based on associated customer information and/or usage information. In this way the default maintenance priority class may be quickly set to correct level by the automation system. It is to be noted that changing the maintenance priority class is not associated with detecting a problem or a need for maintenance actions in the network device. Instead, the maintenance priority class may continuously evolve.

Herein it is noted that phases 402 and 403 concern network devices whose maintenance priority may be dynamically changed. Network devices that a set to have static maintenance priority class are set separately.

Figure 5:
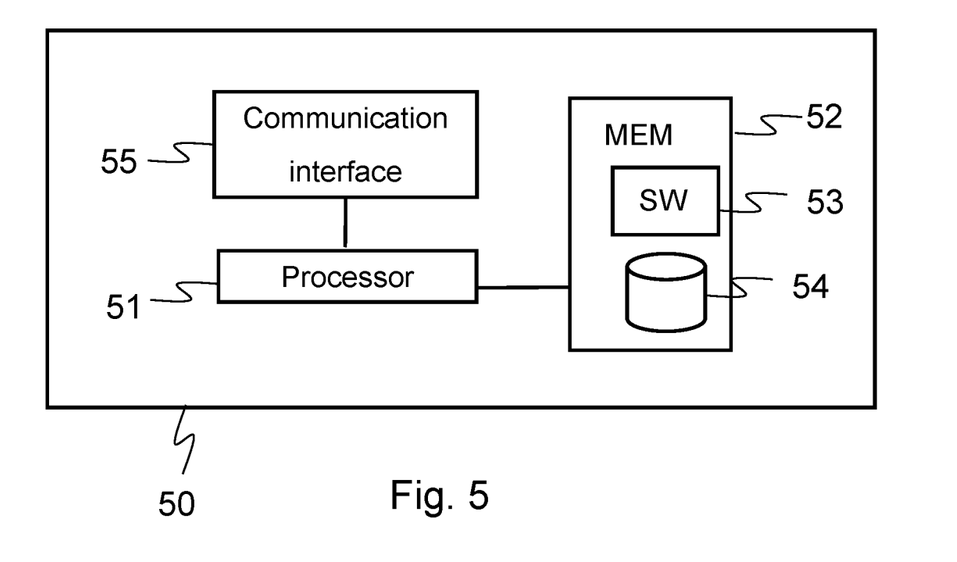
FIG. 5 shows an apparatus according to an embodiment.

FIG. 5 shows an apparatus 50 according to an embodiment. The apparatus 50 is for example a general-purpose computer or server or some other electronic data processing apparatus. The apparatus 50 can be used for implementing embodiments of the present disclosure. That is, with suitable configuration the apparatus 50 is suited for operating for example as the communication network monitoring and control system 111 of foregoing disclosure.

The general structure of the apparatus 50 comprises a processor 51, and a memory 52 coupled to the processor 51. The apparatus 50 further comprises software 53 and database 54 stored in the memory 52 and operable to be loaded into and executed in the processor 51. The software 53 may comprise one or more software modules and can be in the form of a computer program product. The database 54 may be usable for storing e.g. rules and patterns for use in data analysis. Further, the apparatus 50 comprises a communication interface 55 coupled to the processor 51.

The processor 51 may comprise, e.g., a central processing unit (CPU), a microprocessor, a digital signal processor (DSP), a graphics processing unit, or the like. FIG. 5 shows one processor 51, but the apparatus 50 may comprise a plurality of processors.

The memory 52 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 50 may comprise a plurality of memories. The memory 52 may be constructed as a part of the apparatus 50 or it may be inserted into a slot, port, or the like of the apparatus 50 by a user.

The communication interface 55 may comprise communication modules that implement data transmission to and from the apparatus 50. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as Ethernet or universal serial bus (USB), for example. Further the apparatus 50 may comprise a user interface (not shown) for providing interaction with a user of the apparatus. The user interface may comprise a display and a keyboard, for example. The user interaction may be implemented through the communication interface 55, too.

The database 54 may be certain memory area in the memory 52 or alternatively the database 54 may be a separate component or the database 54 may be located in a physically separate database server that is accessed for example through the communication unit 55. The database unit 54 may be a relational (SQL) or a non-relational (NoSQL) database.

A skilled person appreciates that in addition to the elements shown in FIG. 5, the apparatus 50 may comprise other elements, such as microphones, displays, as well as additional circuitry such as memory chips, application-specific integrated circuits (ASIC), other processing circuitry for specific purposes and the like. Further, it is noted that only one apparatus is shown in FIG. 5, but the embodiments of the present disclosure may equally be implemented in a cluster of shown apparatuses.

Without in any way limiting the scope, interpretation, or application of the claims appearing below, a technical effect of one or more of the example embodiments disclosed herein is ability to provide adaptive maintenance priority in communication networks.

Another technical effect of one or more of the example embodiments disclosed herein is that as maintenance priorities are continuously automatically updated, the maintenance priorities are up to date without requiring human interaction. In this way also user experience can be improved. Further updating of the maintenance priority class does not require detecting a problem or need for maintenance actions. That is, instead of ranking failures or problems and prioritizing the order for solving them, network devices are dynamically prioritized so that prioritization is ready when a failure or problem occurs, if any.

If desired, the different functions discussed herein may be performed in a different order and/or concurrently with each other. Furthermore, if desired, one or more of the before-described functions may be optional or may be combined.

Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications, which may be made without departing from the scope of the present disclosure as defined in the appended claims.

The invention claimed is:

1. A computer implemented method of setting maintenance priority for a set of network devices of a communication network, the method comprising:
arranging the set of network devices in an ordered list based on customer information comprising information about requirements of different customers and usage information;
dynamically setting maintenance priority classes for the network devices based on the ordered list, wherein there are at least two different maintenance priority classes; and
outputting the set maintenance priority classes for the network devices for scheduling maintenance operations for fixing forthcoming communication failures in one or more of the network devices, wherein the outputting is implemented prior to occurrence of the forthcoming communication failures,
wherein the maintenance priority class sets a time limit for fixing the forthcoming communication failures.

2. The method of claim 1, further comprising obtaining the usage information from network operation systems.

3. The method of claim 1, further comprising obtaining the customer information from a customer database.

4. The method of claim 1, further comprising obtaining numbers of network devices that may be dynamically assigned to different maintenance priority classes, and using these numbers in said dynamic setting of maintenance priority classes.

5. The method of claim 4, wherein a highest maintenance priority class corresponds to a shortest delay in maintenance actions and lower ranking maintenance priority classes correspond to longer delays in maintenance actions, and wherein the dynamic setting of maintenance priority classes comprises setting the highest maintenance priority class for the first network devices in the ordered list and setting the lower ranking maintenance priority classes for the following network devices in the ordered list.

6. The method of claim 1, further comprising overriding any previous maintenance priority classes of the network devices while setting the maintenance priority classes.

7. The method claim 1, further comprising taking any previous maintenance priority classes of the network devices into account while setting the maintenance priority classes so that new maintenance priority class of a certain network device is one step higher, one step lower or the same as the previous maintenance priority class of said certain network device.

8. The method of claim 1, further comprising when setting up a new network device, setting for the new network device a default maintenance priority class.

9. The method of claim 8, wherein the default maintenance priority class is a second lowest maintenance priority class.

10. The method of claim 8, wherein the default maintenance priority class is at least one step lower than highest available maintenance priority class.

11. The method of claim 1, further comprising consecutively repeating said arranging and dynamic setting after a predefined period of time.

12. The method of claim 11, wherein said predefined period of time is one of the following: 1 day, 3 days, 1 week, 2 weeks, 1 month, 2 months, and 3 months.

13. The method of claim 1, further comprising:
obtaining sizes of the maintenance priority classes; and
setting the first or the last network devices in the ordered list to have the highest maintenance priority class until the highest maintenance priority class is full or nearly full and setting the subsequent network devices in the in the ordered list to have lower ranking maintenance priority classes until the lower ranking maintenance priority classes are full or nearly full.

14. An apparatus comprising:
a processor, and
a memory including computer program code, the memory and the computer program code configured to, with the processor, cause the apparatus to:
arrange a set of network devices of a communication network in an ordered list based on customer information comprising information about requirements of different customers and usage information;
dynamically set maintenance priority classes for the network devices based on the ordered list, wherein there are at least two different maintenance priority classes; and output the set maintenance priority classes for the network devices for scheduling maintenance operations for fixing forthcoming communication failures in one or more of the network devices, wherein the outputting is implemented prior to upon occurrence of the forthcoming communication failures, wherein the maintenance priority class sets a time limit for fixing the forthcoming communication failures.

15. The apparatus of claim 14, wherein the memory and the computer program code are further configured to, with the processor, cause the apparatus to obtain the usage information from network operation systems.

16. The apparatus of claim 14, wherein the memory and the computer program code are further configured to, with the processor, cause the apparatus to obtain the customer information from a customer database.

17. The apparatus of claim 14, wherein the memory and the computer program code are further configured to, with the processor, cause the apparatus to obtain numbers of network devices that may be dynamically assigned to different maintenance priority classes, and to use these numbers in said dynamic setting of maintenance priority classes.

18. The apparatus of claim 14, wherein the memory and the computer program code are further configured to, with the processor, cause the apparatus to take any previous maintenance priority classes of the network devices into account while setting the maintenance priority classes so that new maintenance priority class of a certain network device is one step higher, one step lower or the same as the previous maintenance priority class of said certain network device.

19. The apparatus of claim 14, wherein the memory and the computer program code are further configured to, with the processor, cause the apparatus when setting up a new network device, to set for the new network device a default maintenance priority class.

20. A computer program comprising computer executable program code which, when executed by a processor, causes an apparatus to:
arrange a set of network devices of a communication network in an ordered list based on customer information comprising information about requirements of different customers and usage information;
dynamically set maintenance priority classes for the network devices based on the ordered list, wherein there are at least two different maintenance priority classes; and
output the set maintenance priority classes for the network devices for scheduling maintenance operations for fixing forthcoming communication failures in one or more of the network devices, wherein the outputting is implemented prior to occurrence of the forthcoming communication failures,
wherein the maintenance priority class sets a time limit for fixing the forthcoming communication failures.

* * * * *